March 21, 1967 L. J. BAZIN ETAL 3,310,625
COLOR TELEVISION PHASE TEST APPARATUS
Filed March 10, 1965 9 Sheets-Sheet 1
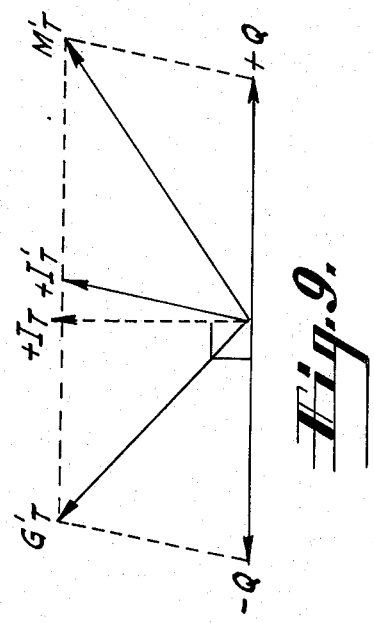
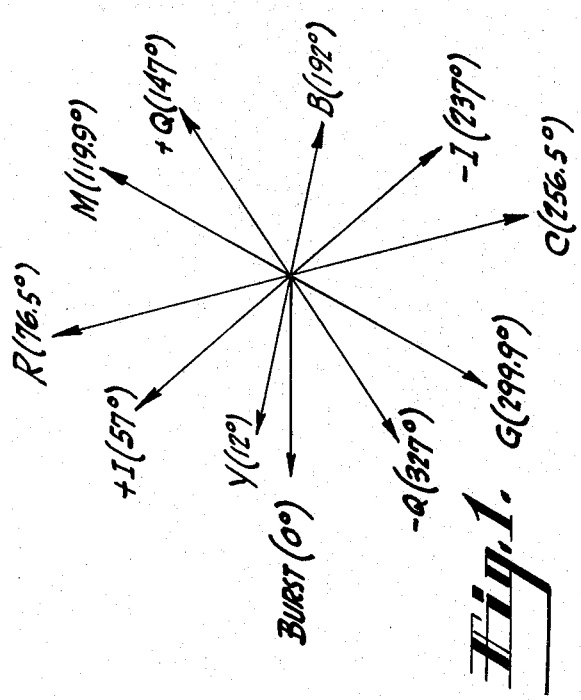
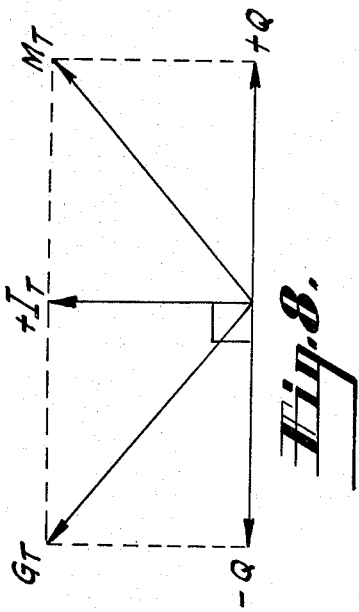
INVENTORS
LUCAS J. BAZIN
ROBERT A. DISCHERT
DAVID M. TAYLOR
BY
Attorney

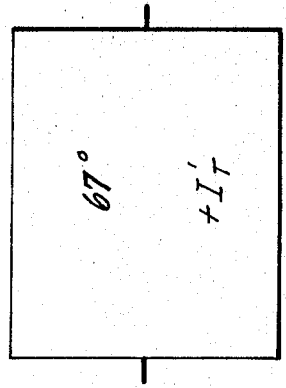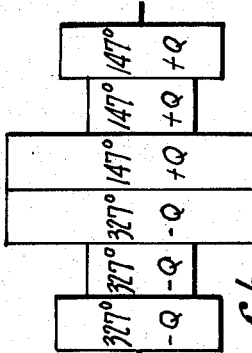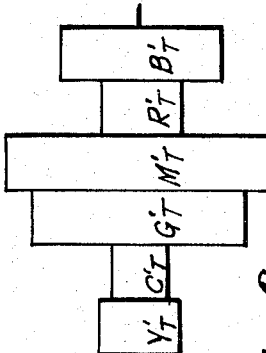
Fig.6a. Fig.6b. Fig.6c.
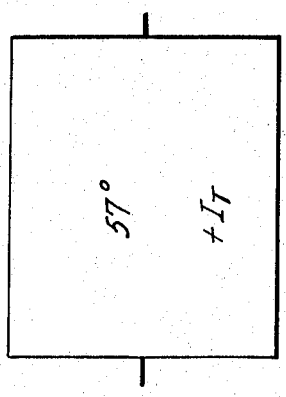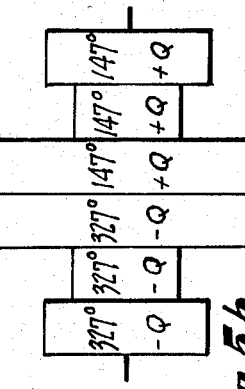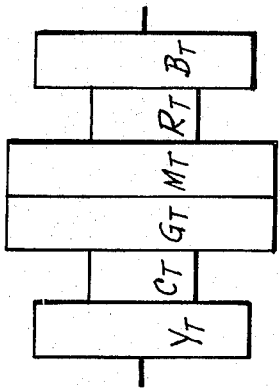
Fig.5a. Fig.5b. Fig.5c.
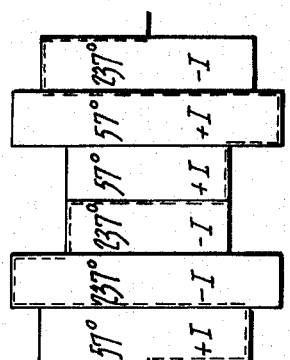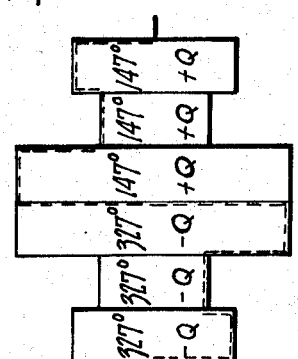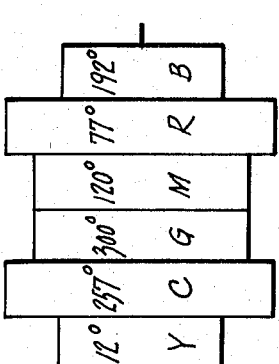
Fig.2a. Fig.2b. Fig.2c.
INVENTORS
LUCAS J. BAZIN
ROBERT A. DISCHERT &
DAVID M. TAYLOR

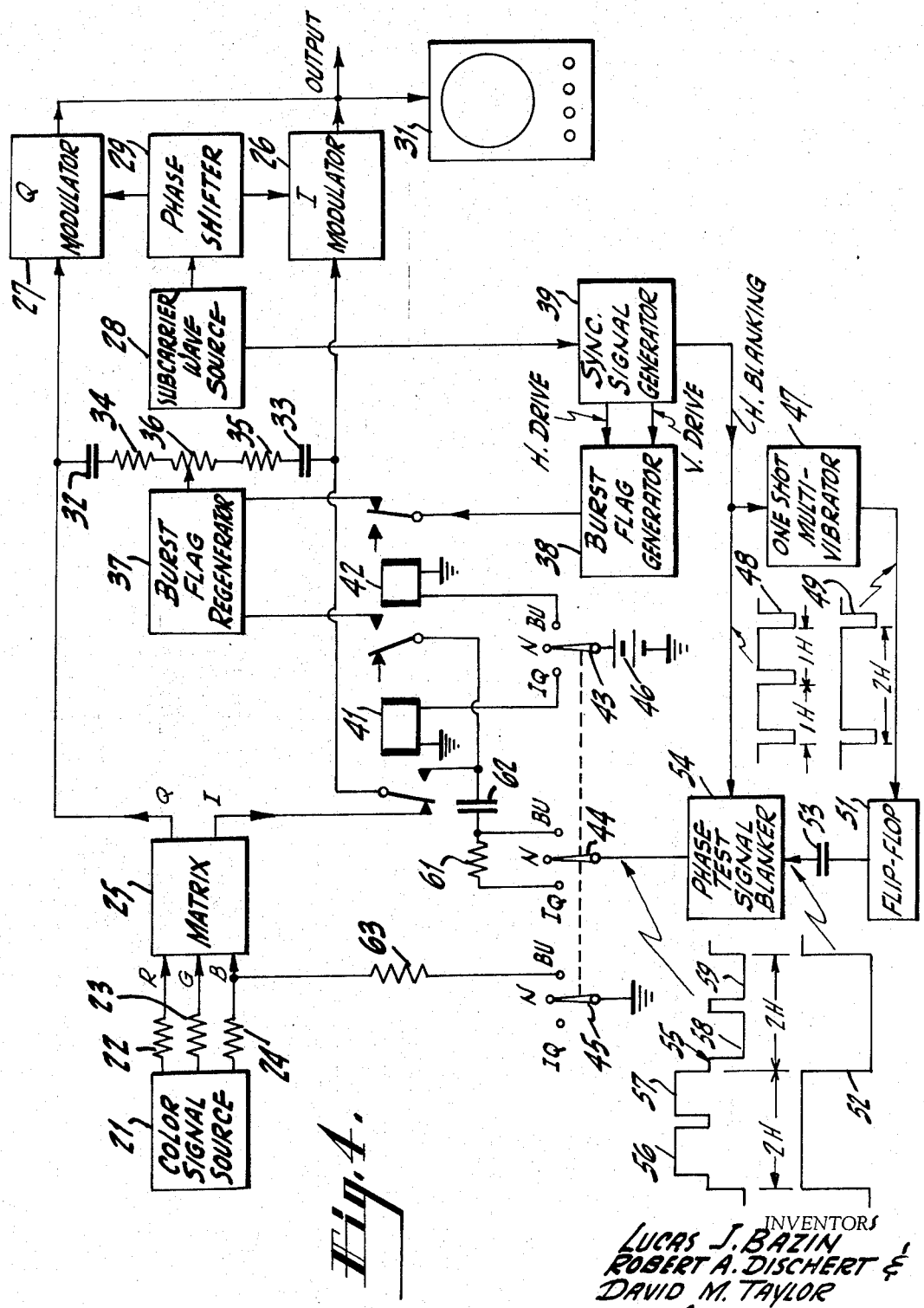

March 21, 1967 L. J. BAZIN ET AL 3,310,625
COLOR TELEVISION PHASE TEST APPARATUS
Filed March 10, 1965 9 Sheets-Sheet 6

INVENTORS
LUCAS J. BAZIN
ROBERT A. DISCHERT &
DAVID M. TAYLOR
BY
Attorney

March 21, 1967  L. J. BAZIN ET AL  3,310,625
COLOR TELEVISION PHASE TEST APPARATUS
Filed March 10, 1965  9 Sheets-Sheet 7

INVENTORS
LUCAS J. BAZIN
ROBERT A. DISCHERT &
DAVID M. TAYLOR
BY W. H. Sprague
ATTORNEY

INVENTORS
LUCAS J. BAZIN
ROBERT A. DISCHERT &
DAVID M. TAYLOR

INVENTORS
LUCAS J. BAZIN
ROBERT A. DISCHERT &
DAVID M. TAYLOR

United States Patent Office 3,310,625
Patented Mar. 21, 1967

3,310,625
COLOR TELEVISION PHASE TEST APPARATUS
Lucas J. Bazin, Stratford, and Robert A. Dischert and David M. Taylor, Burlington, N.J., assignors to Radio Corporation of America, a corporation of Delaware
Filed Mar. 10, 1965, Ser. No. 438,696
15 Claims. (Cl. 178—5.4)

This invention relates to apparatus for testing the phase relationship of the basic color subcarrier components to one another and to the subcarrier itself in a color television system operating in accordance with the standards set for transmitting systems in the United States.

The Federal Communications Commission has promulgated specifications relating to the transmission of color television signals in the United States. These signals comprise a luminance signal component and chrominance signal component, the latter of which includes a subcarrier wave modulated both in phase and in amplitude by signals representative of the color of a subject. The color representative information consists of two basic components commonly referred to as I and Q signals which are formed by certain prescribed combinations of the red, green and blue components of the color subject. The I and Q signals so formed are modulated on quadrature phases of a color subcarrier wave. The subcarrier wave itself is suppressed and not transmitted. In order to properly control a receiver of such signals, there also is transmitted periodically a short burst of the subcarrier wave having a given phase relationship to the I and Q components of the wave. It is important, therefore, to transmit the chrominance signal with the proper phase relationships between the subcarrier burst and the I and Q components.

It is an object of the present invention to provide a relatively simple yet accurate system by which to test the phase relationship of the I and Q signal waves relative to one another and of these waves relative to the subcarrier wave burst.

Another object of the invention is to provide a relatively simple system for checking the performance of the color subcarrier wave modulators so as to assure the production of a chrominance wave which does not include either the subcarrier wave itself or the I and Q component signals by which it is modulated.

In accordance with the present invention, apparatus is provided by which the phase relationship of the I and Q color signal wave components is checked first. Then, the phase relationship of these waves and the subcarrier wave itself is tested so that any discrepancy in the desired relationships may be corrected. Both of these tests are made by using I and Q chrominance waves of the general character used to display color bars on a monitor or receiving device after demodulating, matrixing and other processing of the waves. Instead of observing the color bars themselves, the waves from which they are reproduced are observed on a cathode ray oscilloscope. To determine the quadrature relationship of the I and Q color signal waves a test signal is substituted for the I signal. This test signal is of such a character that, when combined with the color bar Q signal wave component, a composite wave is displayed on the oscilloscope. From such display any deviation from the desired 90° phase relationship between the I and Q wave components may be observed as an amplitude difference of selected sections of the composite wave. Suitable adjustments of the phase relationship of the I and Q wave components may be made while observing the amplitude of the waveform on the oscilloscope until the desired phase relationship is obtained as indicated by the wave amplitude.

In order to determine, by means of the apparatus embodying this invention, the phase relationship between the I and Q signal waves and the color subcarrier burst, one of the color signals used to make the color bar signals is modified in a manner calculated to bring it into a nominal 90° phase relationship to the color subcarrier burst. In making this check a test signal is substituted for the normal subcarrier wave burst. The character of the test signal is such that, when combined with a color bar type signal wave resulting from the described color signal modification, a composite test wave is produced which may be observed on an oscilloscope. From the oscilloscope the phase relationship of the I and Q signal waves to the color subcarrier burst may be determined by an amplitude observation of selected sections of the composite test wave and any deviation from the desired relationship may be corrected while observing the oscilloscope.

For a better understanding of the invention reference will be had to the following description which is taken in conjunction with the accompanying drawings, of which:

FIGURE 1 is a vector diagram showing the phase relationship of different components of a color subcarrier wave such as those employed in reproducing a standard color bar test pattern on a picture tube such as that used in a monitor or receiver;

FIGURE 2a is the envelope of the I phase of the color subcarrier wave modulated with an I signal suitable to make color test bars;

FIGURE 2b is the envelope of the Q phase of the color subcarrier wave modulated with a Q signal suitable to make color test bars;

FIGURE 2c is the envelope of a composite wave formed from the I and Q components represented in FIGURES 2a and 2b;

FIGURE 3 is a representation of the color bars as they appear on a reproducing device from the signal represented by the wave of FIGURE 2c;

FIGURE 4 is a schematic circuit diagram (partly in block diagram form) of apparatus embodying this invention;

FIGURE 5a is the envelope of one basic component of the I test signal wave used for checking the phase relationship between the I and Q signal phases and representing the correct phase of the I component of the subcarrier wave;

FIGURE 5b is the envelope of the Q phase of the color subcarrier wave modulated with a Q signal suitable to make color test bars;

FIGURE 5c is the envelope of the composite wave formed by combining the waves of FIGURES 5a and 5b;

FIGURE 6a is the envelope of an I test signal wave similar to that shown in FIGURE 5a except that it represents an incorrect phase of the I component of the subcarrier wave;

FIGURE 6b is the envelope of the Q phase of the color subcarrier wave modulated with a Q signal suitable to make color test bars;

FIGURE 6c is the envelope of the composite wave formed by combining the waves of FIGURES 6a and 6b showing the result of an incorrect I and Q phase relationship;

FIGURE 7a is the envelope of both of the two basic components of the test signal wave which may be used for checking the phase relationship between the I and Q subcarrier wave components and represents an incorrect phase of the I component such as that shown in FIGURE 6a;

FIGURE 8 is a vector diagram of part of the wave shown in FIGURE 5c and indicating the equal amplitudes of the green and magenta color bar waves when the I and Q phases are in quadrature;

FIGURE 9 is a vector diagram similar to that of FIGURE 8 but showing the unequal amplitudes of the green and magenta color bar waves when the I and Q phases are not in quadrature;

Figure 7A:
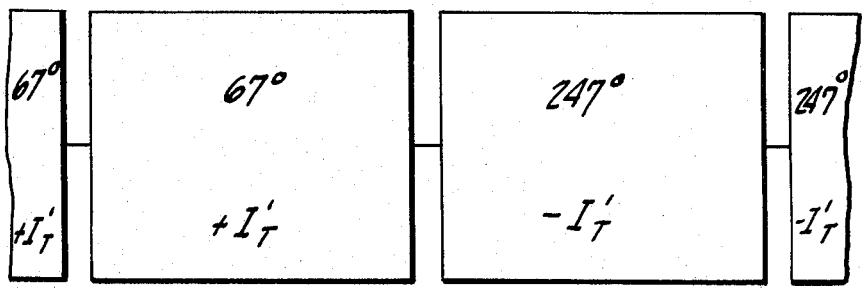

In order to afford a clear understanding of the present invention reference first will be made to FIGURE 1. In this figure, the vectors show the phase interrelationship of the subcarrier wave components representing certain colors and their phase relationship to the subcarrier wave burst and to the I and Q signal components of the composite subcarrier wave which is developed for transmission to a receiver. In this vector diagram there are shown, in addition to the I, Q and burst representative vectors, vectors representing the waves commonly employed to reproduce the colors of a color bar display employed for set up and adjustment of color television camera and auxiliary apparatus. These color bars include yellow, cyan, green, magenta, red and blue which are identified in FIGURE 1 by their initial letters, parenthetically followed by their angular relationship to a vector representing the subcarrier wave burst which is taken as zero degrees for reference purposes of this disclosure.

As further background for the invention, reference now is made to FIGURES 2a, 2b and 2c. The dashed line representation in FIGURE 2a is that of the I (video) signal derived from the color bar generator and the solid line represents the envelope of the I subcarrier wave component of the composite subcarrier wave shown in FIGURE 2c of a color bar representative color subcarrier wave which is capable of being employed to display color bars on a suitable picture reproducing device such as a monitor or a receiver. The dashed line of FIGURE 2b represents the Q (video) signal component derived from the color bar generator and the solid line represents the envelope of the Q subcarrier component of the composite subcarrier wave of FIGURE 2c. In each of these figures the approximate phase of the waves represented in the various blocks is given and it may be seen by reference to FIGURE 1 that the various color bar representative signals identified by their initial letters have phases which correspond to those indicated in the vector diagram. It will be noted that a change in the polarity of the I and Q video signals causes a phase reversal of 180° in subcarrier wave. Also it will be noted that a negative-going I video signal produces what will be referred to herein as a +I subcarrier wave component (i.e., one having a 57° phase relative to burst) and that a negative-going Q video signal produces a −Q subcarrier wave component (i.e., one having a 327° phase relative to burst). One of the reasons for this arrangement, as will appear subsequently, relates to the particular manner in which the subcarrier wave burst is formed in a composite color television signal. Similarly, positive-going I and Q video signals produce −I (237°) and +Q (147°) subcarrier wave components respectively.

A signal such as that represented in FIGURE 2c, when suitably processed by apparatus including synchronous demodulators and applied to a reproducing device, is effective to make a display corresponding to that shown in FIGURE 3. In this figure there are 7 bars which, reading from left to right, comprise white, yellow, cyan, green, magenta, red and blue. Inasmuch as, in a system such as that adopted as standard in the United States, no color subcarrier is used for the representation of a white part of a subject and because the present invention is concerned only with the chrominance subcarrier wave, only those signals representing colors will be considered in the following portions of the description.

It will be noted that both polarities of the I and Q video signal wave components are used in the approximate relative amplitudes shown in FIGURES 2a and 2b to produce the composite color bar representative signals Y, C, G, M, R and B of FIGURE 2c. In this latter figure the phases of the different color bar signal waves relative to the subcarrier wave or burst signal are indicated and may be seen to be the same as the corresponding standard color signal phases shown in FIGURE 1. In the operation of the test apparatus embodying this invention, however, only the amplitudes of certain ones of the color bar signal wave are observed as indications of the phase relationship between the basic signal components, viz., I, Q and burst.

As an example, consider the manner in which the green and magenta color bar signal waves G and M respectively, are produced from the I and Q wave components when the desired quadrature phase relationship exists between the I and Q waves. As indicated in FIGURE 2a, a −I wave component having a 237° phase relative to burst and a first amplitude is combined with a −Q wave component having a 327° phase relative to burst and a second amplitude to produce a green color bar signal wave G having an approximately 300° phase relative to burst and a third amplitude. Also, a +I wave component having a 57° phase relative to burst and said first amplitude is combined with a +Q wave component having a 147° phase relative to burst and said second amplitude to produce a magenta color bar signal wave M having an approximately 120° phase relative to burst and said third amplitude. Although the 180° phase relationship between the green and magenta color bar signal waves G and M, respectively, cannot be observed on an oscilloscope displaying these signals, the relative amplitudes of these signals can be readily discerned. The present invention makes use of this latter type of display in a manner to be described subsequently.

The waves of FIGURES 2a, 2b and 2c are produced by signal encoding apparatus such as RCA type TX-1D Colorplexer, the character of and operating instructions for which are given in a booklet identified as IB-36252-2 published by Radio Corporation of America, Camden, New Jersey.

The present invention makes use of waves similar to those shown in FIGURE 2c when displayed on a cathode ray oscilloscope. The apparatus by which these signals are so employed is shown in FIGURE 4. The color signal source 21 produces at its output red, green and blue color representative signals R, G and B which are applied respectively through resistors 22, 23 and 24 to a matrix 25 which is embodied in the TX-1D Colorplexer. The color signal source may be a camera either of the studio type used for live pickup or a film scanner used in conjunction with photographic film. Alternatively, the signal source may be a color bar generator such as an RCA type WA-1E Color Bar Generator, the character of and operating instructions for which are set forth in a booklet identified as IB-24957-2 published by Radio Corporation of America, Camden, N.J.

The red, green and blue signals R, G and B applied to the matrix 25 are combined in a suitable manner to produce I and Q color difference signals at the output of the matrix. These signals have respective amplitudes corresponding to the different amplitudes of the waves shown in FIGURES 2a and 2b.

In normal operation of the colorplexer such as the one referred to, the I and Q signals are impressed as modulating signals respectively upon I and Q modulators 26 and 27. These modulators normally are supplied with appropriate quadrature phases of the subcarrier wave developed in a subcarrier wave source 28 and applied through a phase shifter 29. It is to be understood that the referenced colorplexer normally supplies to the I and Q modulators respective I and Q waves having the phase relation to the subcarrier wave burst indicated in FIGURE 1. For the generation of color bar representative signal waves, the wave derived from the I modulator 26 has the form indicated in FIGURE 2a. Similarly, the wave derived from the Q modulator 27 is represented by that shown in FIGURE 2b. The outputs of the two modulators are combined and the composite wave as represented in FIGURE 2c is impressed upon a cathode ray oscilloscope 31 in addition to being supplied to the regular output circuit of the apparatus as indicated.

A commonly employed way of producing a short burst of the color subcarrier wave during each horizontal blanking interval and the way in which the TX-1D Colorplexer performs this function is by combining suitable amplitudes of the outputs of the I and Q modulators 26 and 27. For this purpose there is connected between the modulating signal inputs of the modulators a network including coupling capacitors 32 and 33, resistors 34 and 35 and a potentiometer 36. This network provides the necessary modulating signals under the control of a burst flag regenerator 37 which is normally operated by a burst flag signal or pulse derived from a burst flag generator 38 which is controlled by horizontal and vertical drive pulses supplied by a sync signal generator 39. The burst flag signal is timed to occur during the burst interval on the so-called "back-porch" of the horizontal synchronizing signal as specified in the standard signal specification promulgated by the Federal Communications Commission. The setting of the potentiometer 36 determines the relative amplitudes of the modulating signals applied to the I and Q modulators 26 and 27 for the development of the burst signal in the output circuits of these modulators. As previously indicated with reference to FIGURES 2a and 2b, when the I and Q signals impressed upon the modulators 26 and 27 are both negative-going, subcarrier wave components at 57° and 327° phases are produced by the modulators. As may be seen from the vector diagram of FIGURE 1 the phase of the subcarrier wave burst which is produced by the modulators is dependent upon the relative amplitudes of the burst generating I and Q modulating signals applied during the described back porch interval.

The burst flag regenerator 37 is essentially an amplifier, preferably transistorized with a gain control facility, of pulses occurring at the horizontal line repetition rate. The burst flag generator 38 may be an RCA Burst Flag Generator MI-40202A, the character of and operating instructions for which are set forth in a booklet identified as IB-36200, published by Radio Corporation of America, Camden, N.J. The sync signal generator 39 may be the RCA type TG-2A Sync Generator, the character and operating instructions of which are set forth in a booklet identified as IB-36155-3, published by Radio Corporation of America, Camden, N.J. The subcarrier wave source 28 may be an RCA Color Frequency Standard MI-40201-B, the character of and operating instructions for which are set forth in a booklet identified as IB-36201-B, published by Radio Corporation of America, Camden, N.J.

The RCA Color Frequency Standard, serving as the subcarrier wave source 28, produces an accurately controlled wave at the frequency of approximately 3.579 megacycles per second prescribed by the Federal Communications Commission for the color subcarrier wave. This wave is impressed through the phase shifter 29 upon the I and Q modulators 26 and 27, respectively. This Color Frequency Standard also supplies a wave at a frequency of approximately 31.468 kilocycles per second which is twice the horizontal frequency of approximately 15.734 kilocycles per second prescribed by the Federal Communications Commission. The subcarrier wave source 28 and the sync signal generator 39 are locked in frequency by impressing the 31.468 kilocycle per second wave derived from the source 28 upon the sync signal generator 39.

The apparatus described up to this point is commonly used and does not require any of the additional apparatus now to be described which embodies the present invention for its successful operation. This known apparatus, however, when used in conjunction with the test apparatus to be described does play an important role. This additional phase checking apparatus includes relays 41 and 42 for making appropriate switches to perform the desired tests. One or the other of these relays is operated to perform one or the other of these tests under the control of a switch 43. This switch is mechanically connected to two other switches 44 and 45 as indicated for simultaneous operation. For normal operation of the colorplexer apparatus, these switches are positioned on their normal contacts N in which positions neither of the relays is operated and none of the test circuit apparatus is connected to the colorplexer and other apparatus.

When it is desired to check the phase relationship between the I and Q color subcarrier wave components the switches 43, 44 and 45 are placed on their left hand contacts designated IQ. This contact of the switch 43 causes the energization of the relay 41 by connecting it to a suitable power source such as that indicated by the battery 46. The operation of the relay 41 disconnects the normal I signal output of the matrix 25 from the I modulator 26 input. Instead, the input of the modulator 26 is connected by the operated relay 41 to a circuit by which an I test signal is generated.

The test signal generating circuit includes a one-shot multivibrator 47 which is triggered by a series of blanking pulses 48 derived from the sync signal generator 39 at the repetition rate of the horizontal lines of a television raster. As is well known, these pulses occur at the rate of approximately 15,734 per second in a color television system. In the output circuit of the multivibrator 47 there is produced another series of pulses 49 having half the horizontal line repetition rate. These pulses are impressed upon a non-additive mixing flip-flop circuit 51 to produce a square wave 52 which, when impressed by a coupling capacitor 53 upon a phase test signal blanker 54, has positive- and negative-going half cycles, each of which occurs in the interval of two horizontal line periods. The line rate blanking impulses 48 derived from the sync signal 39 also are impressed upon the phase test signal blanker 54 so as to effectively reduce the amplitude of the wave 52 to zero during each blanking interval between successive horizontal lines. As a result there is produced in the output of the phase test signal blanker 54 a test signal 55 having the form shown in which the amplitude of the wave is effectively reduced to zero between successive horizontal line scansions, thereby producing two positive-going test signal segments 56 and 57 and two negative-going test signal segments 58 and 59, each segment being substantially of one horizontal line time duration.

This test signal 55 is applied through the switch 44, its IQ contact, a resistor 61, a capacitor 62, and the activated contact of the relay 41 to the modulating signal input of the I modulator 26. The Q signal, derived from the matrix 25 forming part of the TX-1D Colorplexer, is applied to the modulating signal input of the Q modulator 27 as in the normal operation of the apparatus for the production of signals from which to reproduce color test bars.

FIGURE 5a represents the $+I_T$ wave component derived from the I modulator 26 of FIGURE 4 during a horizontal line period in which the test signal 55 is positive-going as indicated by either of the segments 56 and 57 in FIGURE 4. In this case it is assumed that I and Q modulators 26 and 27 are supplied with quadrature phases of the subcarrier wave. As indicated in FIGURE 1, for example, the I modulator phase is 57° relative to the reference burst phase and the Q modulator wave has either a 147° or a 327° phase relationship to the burst phase as indicated in FIGURE 5b. Therefore, the combination of the waves of FIGURES 5a and 5b produces the composite wave shown in FIGURE 5c which, when impressed upon the oscilloscope 31, has the general appearance of that shown in FIGURE 5c. In making the I and Q phase test the oscilloscope is observed to determine the relative amplitudes of the green and magenta test waves $G_T$ and $M_T$, respectively. When the I and Q phases are in exact quadrature, the green and magenta test waves $G_T$ and $M_T$ representations on the oscilloscope have identical amplitudes as shown in FIGURE 5c. It is to be understood that the designations of these test waves by colors in this and following portions of this description is solely for convenience of reference. These test waves merely occupy the same positions on the oscilloscope as those representing the actual named colors in a presentation such as that of FIGURE 2c, for example.

Assume, now, the case where the Q phase relative to burst is correct but the I phase is not, as, for example, in the instance where the I phase is 67° relative to the burst phase. When the test signal 55 is applied to the I modulator 26 of FIGURE 4, a wave having the form shown in FIGURE 6a is produced in the output of the I modulator during one horizontal line period. The general form of the envelope is the same as in the previous assumed instance but in this case the phase is indicated as 67°. When this wave is combined with the accurately phased Q signal wave shown in FIGURE 6b there is produced the wave shown in FIGURE 6c which is impressed upon the oscilloscope 31 where it is represented as shown in FIGURE 6c. In this case it is seen that the amplitude of the magenta test wave $M_T$ is noticeably greater than that of the green test wave $G_T$. It is this difference in amplitude which indicates that the phases of the waves from the I and Q modulators 26 and 27, respectively, are not in quadrature with one another. An appropriate adjustment of the phase control for the I modulator is made in the colorplexer apparatus to achieve a presentation on the oscilloscope 31 such as that shown in FIGURE 5c in which the green and magenta test wave envelopes have the same amplitude.

In the foregoing description of the I and Q phase check, reference has been made to the use of only one selected segment, such as either of the segments 56 and 57, of the test signal 55 of FIGURE 4. Although only one segment of the test signal 55 is used to make the described I and Q phase check, at least one segment of each polarity of the signal is used for other purposes including the subcarrier wave burst check to be described subsequently. Hence, it is convenient to use the same test signal for all purposes. Accordingly, in making the I and Q phase check with the test signal 55, the resulting composite test waves, such as those illustrated in FIGURES 5c and 6c, may be reproduced on the oscilloscope in any one of a number of ways. One way is by effecting each horizontal deflection of the oscilloscope beam over a period of four horizontal scanning lines. In such case the waves of FIGURES 5c and 6c will be repeated four times across the screen of the oscilloscope. In the case of the wave of FIGURE 5c, each of the four repetitions will be identical in appearance because of the symmetrical nature of the wave irrespective of the polarity or phase of the test wave of FIGURE 5a as determined by the polarity of the segments of the test signal 55 of FIGURE 4. In the case of the wave of FIGURE 6c, however, two of the repetitions will be as shown in this figure and the other two will be reversed because of the opposite polarity of the test wave employed. In either case, the desired phase check may be made by observing amplitude differences of certain segments of the composite test wave on the screen of the oscilloscope. This may be seen from the following description taken in conjunction with FIGURES 7a, 7b, and 7c.

Figure 7B:
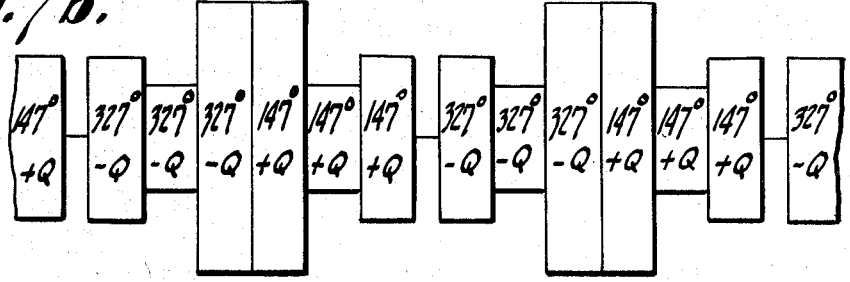
FIGURE 7b is the envelope of the Q phase of the color subcarrier wave modulated with a Q signal suitable to make color test bars.
Figure 7C:
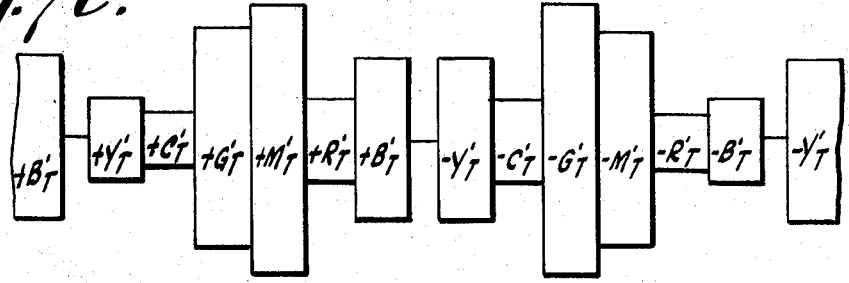
FIGURE 7c is the envelope of the composite wave formed by combining the waves of FIGURES 7a and 7b showing two versions of the result of an incorrect I and Q phase relationship.

The previously assumed case of improper phase of the I signal wave as described with reference to FIGURE 6 is again assumed. The two portions of the I test wave shown in FIGURE 7a respectively have both polarities of the I test wave, viz, $+I'_T$ and $-I'_T$. These two portions of the I test wave are produced under the control of segments 57 and 58 of the test signal 55 of FIGURE 4. Only fragmentary indications are shown of the portions of the I test wave produced under the control of segments 56 and 59 of the test signal 55 because they are merely repetitions of the test wave portions completely shown. FIGURE 7b is the Q phase wave component which is repeated in all horizonal line periods and corresponds to the Q phase wave of FIGURE 6b. In FIGURE 7c the left hand portion of the composite test wave designated $+Y'_T$ through $+B'_T$ corresponds to the composite test wave shown in FIGURE 6c and produced by the $+I'_T$ test wave. The right hand portion of the wave of FIGURE 7c designated $-Y'_T$ through $-B'_T$ is a reversal of the wave shown in the left hand portion and is produced by the $-I'_T$ test wave. The reversed character of the left and right hand portions of the composite test wave of FIGURE 7c may be seen, for example, by noting that the wave segment designated $-M'_T$ has the same amplitude as the wave segment designated $+G'_T$ and the wave segment designated $-G'_T$ has the same amplitude as the wave segment designated $+M'_T$.

It may be seen from an examination of FIGURE 7c that a continuous display of the IQ phase test waves produced during four successive horizontal line periods enables a determination of any amplitude discrepancy between selected wave segments such as those designated $G_T$ and $M_T$. Furthermore, such determination may be made by an examination of any of the test wave portions produced during any of the four horizontal line periods.

Figure 7D:
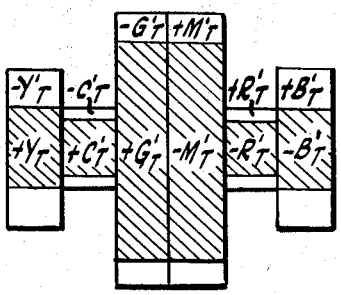
FIGURE 7d shows a presentation on a cathode ray oscilloscope (different from the presentation indicated in FIGURE 6c) of the superposition of the two versions of the composite wave of FIGURE 7c when the I and Q phase relationship is incorrect.

The IQ phase test which can be made in accordance with this invention, however, is not limited to this particular kind of waveform display on the screen of the oscilloscope. The horizontal sweep of the oscilloscope beam may be effected at other rates, as for example, at the horizontal line repetition rate. In such a case, the different wave portions produced during the four successive line periods will be superimposed upon one another as reproduced on the oscilloscope screen. FIGURE 7d illustrates such a case. Where one segment of a wave portion is superimposed upon a corresponding segment of another wave portion the presentation on the oscilloscope screen will be more intense where the amplitudes of the superimposed segments coincide. Where the amplitude of one superimposed segment exceeds that of the segment upon which it is superimposed, the excess in wave amplitude will cause a less intense presentation on the oscilloscope screen. The difference in intensity may be readily discerned. As an example, in FIGURE 7d the amplitude of the segment designated $-G'_T$ exceeds that of the corresponding segment designated $+G'_T$. Similarly, the amplitude of the segment designated $+M'_T$ exceeds that of the segment designated $-M'_T$. To the one making the IQ phase check, any excessive amplitude of the described superimposed wave segments is an indication of an incorrect phase relationship between the I and Q wave components. Hence, it is seen that the apparatus embodying the present invention may be used in a number of different ways to effect the desired check of the I and Q wave phases.

For a more complete understanding of the reason that amplitude relationships of selected test waves may be used as an indication of the phase relationship between the I and Q subcarrier wave components, additional reference now is made to FIGURES 8 and 9 which are vector diagrams representing the assumed conditions previously described with reference to FIGURES 5 and 6. The vectors $+I_T$, $+Q$ and $-Q$ of FIGURE 7 represent the corresponding wave components of FIGURES 5a and 5b when the I and Q phases have the desired quadrature relationship. The vectors representing the green and magenta test waves $G_T$ and $M_T$ then have equal amplitudes as indicated in FIGURE 8. In FIGURE 9 the vector diagram illustrates the described conditions assumed with reference to FIGURES 6a and 6b in which the I test wave $+I'_T$ does not have a quadrature phase relationship to the Q wave component. Here it is seen that the vector representing the green test wave $G'_T$ has a smaller amplitude than the vector representing the green test wave $G_T$ of FIGURE 8. At the same time the vector representing the magenta test wave $M'_T$ has a greater amplitude than the vector representing the magenta test wave $M_T$ of FIGURE 8.

Figure 10A:
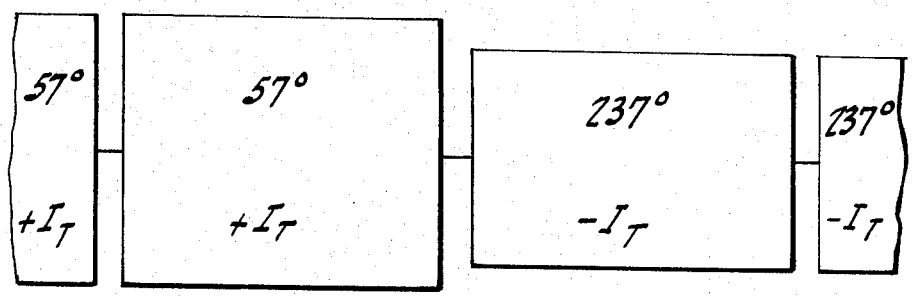
FIGURE 10a is the envelope of both polarities of the I phase test signal wave used to check the I subcarrier wave modulator symmetry and indicating an unsymmetrical condition.

One of the reasons for utilizing a test signal such as the phase test signal 55 of FIGURE 4 having segments 56, 57 and 58, 59 all of equal amplitude but of opposite polarity is to enable checking of the symmetry of operation of the I modulator 26, for example. Such a test may be made by observing the relative amplitudes of certain segments of the composite test wave displayed on the oscilloscope. Assume, for example, that the I modulator 26 is not perfectly balanced for the modulating signal applied to its input circuit with the switches 43, 44 and 45 of FIGURE 4 in their respective IQ positions which results in the application of the test signal 55 to the input circuit of the modulator 26 as previously described. An example of such an unbalance is represented in FIGURE 10a. The positive-going segments 56 and 57 of the test signal 55 produce $+I_T$ waves having a relatively large amplitude and the negative-going segments 58 and 59 of the test signal 55 produce $-I_T$ waves having relatively small amplitudes. Such an amplitude disparity is caused by the unsymmetrical operation of the I modulator 26 of FIGURE 4.

Figure 10B:
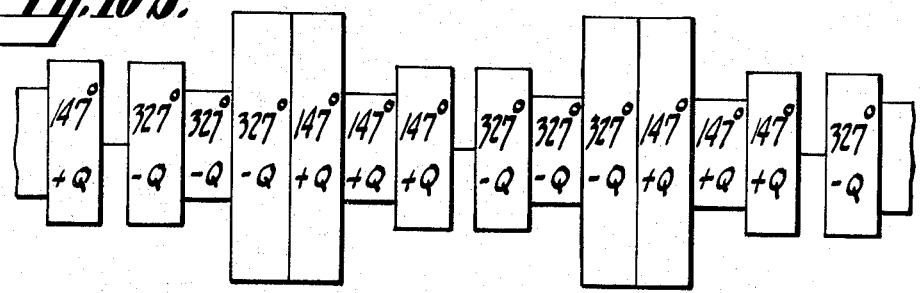
FIGURE 10b is the envelope of the Q phase of the color subcarrier wave modulated with a Q signal suitable to make color test bars.
Figure 10C:
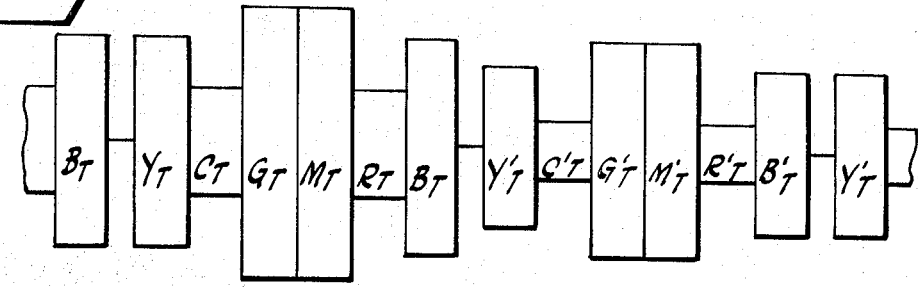
FIGURE 10c is the envelope of the composite wave formed by combining the waves of FIGURES 10a and 10b.
Figure 10D:
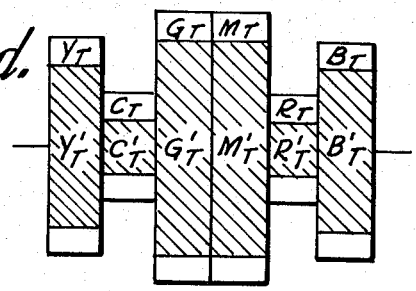
FIGURE 10d is an oscilloscope representation of the superposition of the two halves of the wave shown in FIGURE 10c.

When the test wave represented in FIGURE 10a is combined with the Q signal wave of FIGURE 10b, there is produced a composite wave such as that shown in FIGURE 10c for impression upon the oscilloscope 31. When the oscilloscope is adjusted to display the composite subcarrier wave for a single line period, the wave of FIGURE 10c has the appearance on the oscilloscope of the wave shown in FIGURE 10d. Such an oscilloscope presentation is one in which the waves occurring during successive line periods are superimposed upon one another. In other words the wave designated $Y_T$ through $B_T$ is superimposed upon the wave designated $Y'_T$ through $B'_T$. The superposition of these two wave components upon one another produces a presentation in which an intense image is created during those portions of the composite wave in which the amplitudes coincide and a less intense image represents the excess in amplitude of one wave portion over the other. In FIGURE 10d, for example, the green test wave $G'_T$ having an amplitude less than the green wave $G_T$ is shown by the cross-hatched section of the wave and the excess in amplitude of the green test wave $G_T$ over the wave $G'_T$ is not cross-hatched. The representation in this figure is generally the same as that observed on an oscilloscope and indicates an unbalance in operation of the I modulator 26 of FIGURE 4. A suitable adjustment of the TX–1D Colorplexer embodying such a modulator may be made so as to produce equal amplitudes of the $+I_T$ and $-I_T$ test waves of FIGURE 10a so as to produce a recurrent wave similar to that shown in each FIGURE 10c, but in which the various segments have the same respective amplitudes in each occurrence. When such a condition is reached the presentation on the oscilloscope will include no outlying wave portions such as those indicated by the symbols $M_T$ and $G_T$ in FIGURE 10d.

When the wave display on the oscilloscope for the IQ phase check is that represented in FIGURE 7d, such a display is similar to that represented in FIGURE 10d for the modulator unbalance check. One way to avoid any ambiguity is to first make a single horizontal line display of either the left-hand or right-hand portions of the wave represented in FIGURE 7c to check and adjust for quadrature I and Q subcarrier wave phases and second to check for modulator unbalance as described. Another practical way to resolve any ambiguity between displays such as represented in FIGURES 7d and 10d, is to first adjust the I and Q subcarrier wave phases by minimizing the amplitude differences of the superimposed $G_T$–$G'_T$ and $M_T$–$M'_T$ segments of the oscilloscope display. This is an indication of the attainment of the desired quadrature IQ phase relationship. Any remaining amplitude differences of these displayed segments is an indication of modulator unbalance which then may be corrected as described.

When it is desired to check the phase of the subcarrier wave burst, the switches 43, 44 and 45 of FIGURE 4 are operated to their BU positions. The relay 41 is returned to its unoperated condition in which the I signal output from the matrix 25 is connected to the input circuit of the I modulator 26. The relay 42 is operated to disconnect the burst flag generator 38 from the burst flag regenerator 37 and to connect the phase test signal blanker 54 to the burst flag regenerator 37 by way of capacitor 62. By such means the phase test signal 55 is applied to the burst flag regenerator 37 so that it is applied to the input circuits of the modulators 26 and 27 continuously during the entire horizontal line period. The amplitude relationship of the test signal segments applied to the modulators 26 and 27 is determined by the adjustment of the potentiometer 36. At the same time, the I and Q color test bar signals derived from the matrix 25 also are applied to the input circuits of the I and Q modulators 26 and 27. The composite test wave produced in the output circuits of the modulators 26 and 27 is applied to the oscilloscope 31.

In making this test by comparing the relative amplitudes of selected portions of the composite wave applied to the oscilloscope 31 it is necessary to establish a quadrature phase relationship between the subcarrier wave burst and another wave component. As may be seen from FIGURE 1, there is no other wave component representing any of the color bars which has a normal quadrature phase relationship to the burst. Accordingly, to make the phase test of the subcarrier wave burst, the wave component representing the cyan color bar is modified in a manner calculated to place it in phase quadrature with the burst when the burst has the proper phase relationship.

As may be seen from FIGURE 1, for example, a wave represented by the cyan vector C is the resultant of a combination of waves represented respectively by the blue and green vectors B and G, respectively. The desired modification of the cyan wave represented by the vector C is made by reducing the amplitude of the blue representative wave indicated by the vector B to a calculated degree.

Figure 11:
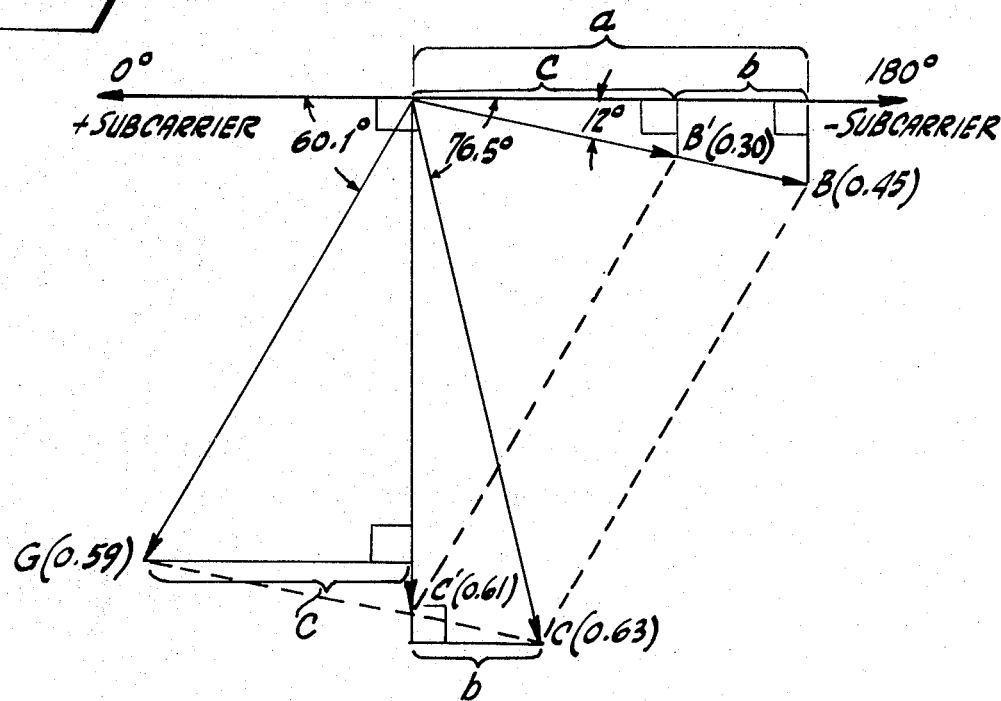
FIGURE 11 is a vector diagram showing the calculated modification of the blue signal amplitude in order to bring the cyan representative color bar signal into a quadrature phase relationship with a subcarrier wave which is correctly phased relative to the I and Q signal phases.

The following calculation of this amplitude reduction is made with reference to the vector diagram of FIGURE 11. Normally the cyan representative wave, designated by the vector C, having a relative amplitude 0.63 (indicated in parentheses), is the resultant of the combination of a green representative wave G having a relative amplitude 0.59 and a blue representative wave B having a relative amplitude 0.45. The calculation is to determine the relative amplitude B' of a test wave, having the phase of the blue wave B, which when combined with the green wave G will produce a cyan test wave C' in phase quadrature with a correctly phased subcarrier wave burst. From this figure it is seen that $$c = 0.59 \cos 60.1°$$

also $$c = B' \cos 12°$$

hence $$B' = \frac{0.59 \cos 60.1°}{\cos 12°} = \frac{0.59 \times 0.4985}{0.9781}$$

$$B' = 0.30$$

Accordingly, the combination of a wave G having the normal phase and amplitude to produce a green bar and a wave B' having the normal phase and two-thirds (0.30/0.45) of the normal amplitude to produce a blue bar will produce the desired cyan test wave C' having a relative amplitude of 0.61 and a phase which is in quadrature with a properly phased subcarrier wave burst.

This calculated amplitude reduction of the blue signal is effected by means of the switch 45 of FIGURE 4 in its BU position in which a resistor 63 is connected to ground from the blue signal input B to the matrix 25. The resistors 24 and 63, therefore, constitute a voltage divider by which the desired reduction in amplitude of the blue signal is achieved.

Figure 12A:
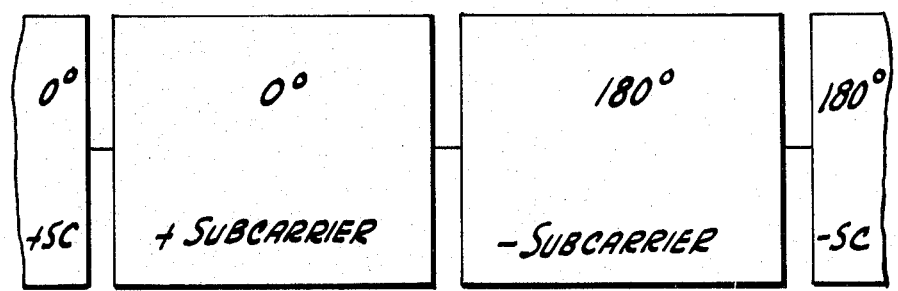
FIGURE 12a is the envelope of the burst test signal wave when the subcarrier wave is correctly phase relative to the I and Q signal phases.
Figure 12B:
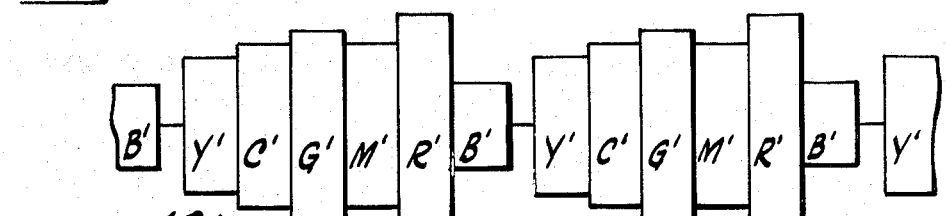
FIGURE 12b is the envelope of the composite wave of the general form used for color bar display purposes and resulting from the modification of the blue color bar signal as represented in FIGURE 11.
Figure 12C:
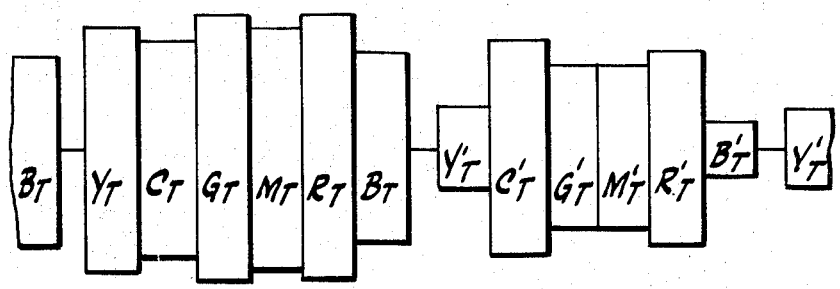
FIGURE 12c is the envelope of the composite wave formed by combining the waves of FIGURES 12a and 12b.

FIGURE 12a represents the envelope of the subcarrier burst test wave derived from the modulators 26 and 27 as produced by segments 57 and 58 of the test signal 55 of FIGURE 4. FIGURE 12b represents the envelope of the color bar wave derived from the modulators 26 and 27 as produced by the I and Q color bar components derived from the matrix 25. The wave of FIGURE 12b differs from the color bar wave of FIGURE 2c because of the described modified blue signal B' applied to the matrix 25 of FIGURE 4 in which the red, green and blue signals R, G and B, respectively, are combined to produce the I and Q signals. FIGURE 12c represents the composite wave resulting from the combination of the waves of FIGURES 12a and 12b. It is seen that the left- and right-hand portions of this composite wave have different amplitudes in corresponding segments such as $Y_T$, $Y'_T$ and $G_T$, $G'_T$ for example. For the purpose of the burst phase test, however, only the amplitude of the wave segments designated $C_T$, $C'_T$ are significant. In the case illustrated by the waves of FIGURE 12 it is assumed that the subcarrier wave burst is correctly phased. Hence, regardless of the polarity of the subcarrier test wave of FIGURE 12a the $C_T$ and $C'_T$ segments of the composite wave of FIGURE 12c have identical amplitudes.

Figure 12D:
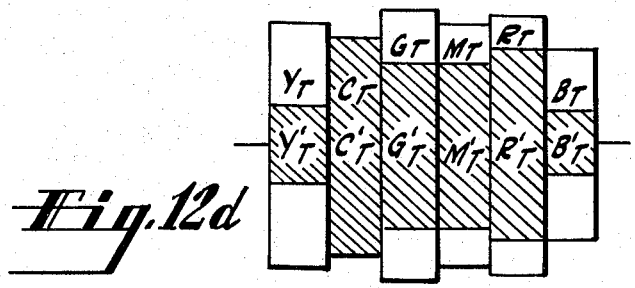
FIGURE 12d shows the presentation on a cathode ray oscilloscope of the superposition of both halves of the wave of FIGURE 12c when the burst phase is correct with respect to the I and Q signal phases.

The amplitude relationship of the $C_T$ and $C'_T$ segments of the composite wave of FIGURE 12c may be readily observed when the left- and right-hand portions of the wave are superimposed on the oscilloscope 31 of FIGURE 4. The oscilloscope presentation is illustrated in FIGURE 12d from which it is seen that the amplitudes of the $C_T$ and $C'_T$ segments of the composite wave are identical.

Figure 13A:
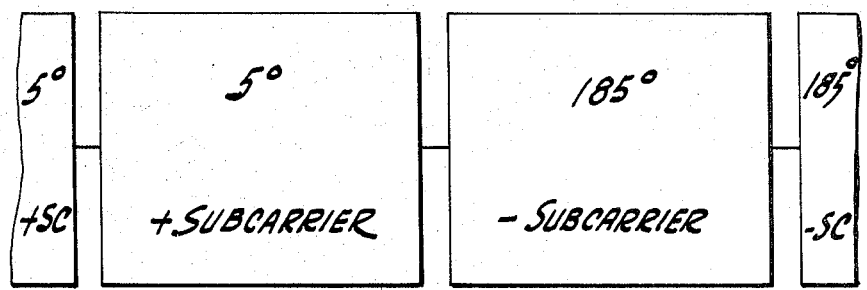
FIGURE 13a is the envelope of the burst test signal wave when it is incorrectly phased relative to the I and Q signal phases.
Figure 13B:
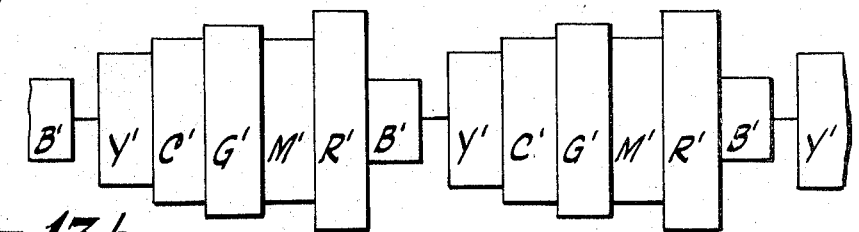
FIGURE 13b is the envelope of the composite wave of the general form used for color bar display purposes and resulting from the modification of the blue color bar signal as represented in FIGURE 11.
Figure 13C:
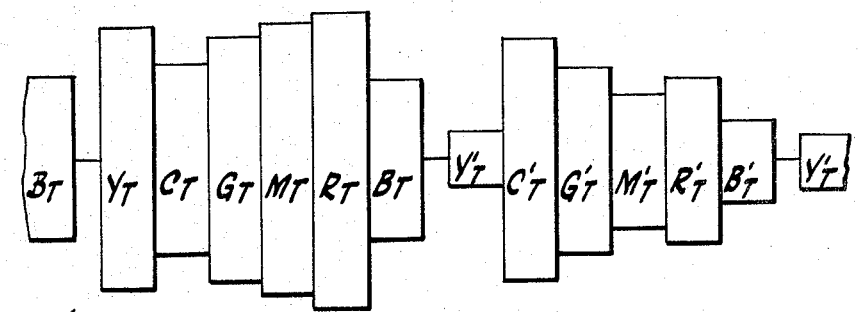
FIGURE 13c is the envelope of the composite wave formed by combining the waves of FIGURES 13a and 13b.
Figure 13D:
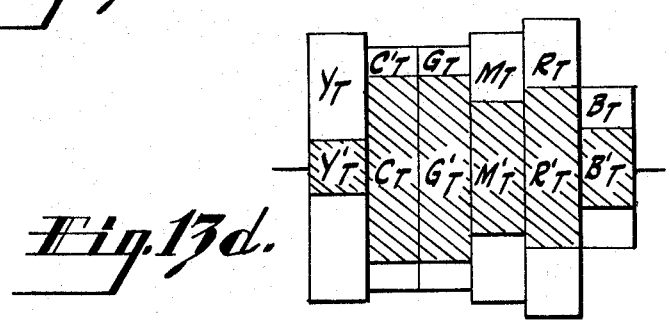
FIGURE 13d shows the presentation on a cathode ray oscilloscope of the superposition of both halves of the wave of FIGURE 13c when the burst phase is incorrect with respect to the I and Q signal phases.

In FIGURE 13a it is assumed that the subcarrier wave burst differs from its proper phase by 5° so that, when both polarities of it are combined with the color bar wave of FIGURE 13b, the composite wave of FIGURE 13c is produced. The superposition of the left- and right-hand portions of the composite wave in the oscilloscope presentation is represented in FIGURE 13d. From this it can be seen that the $C_T$ and $C'_T$ segments of the wave have different amplitudes which indicates that the subcarrier wave burst does not have the proper phase. A suitable adjustment of the burst phase control of the TX–1D Colorplexer, represented by the potentiometer 36 of FIGURE 4, may then be made to produce the correct burst phase, a condition indicated by the oscilloscope presentation shown in FIGURE 12d as previously described.

Figure 14:
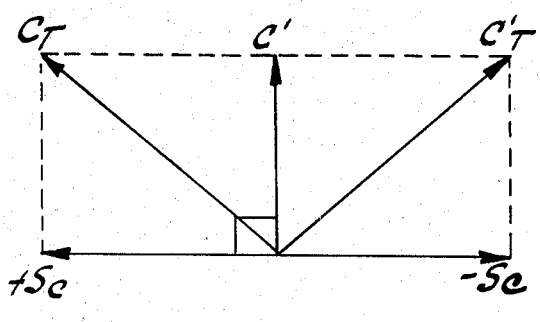
FIGURE 14 is a vector diagram of part of the wave of FIGURE 12c showing the equal amplitudes of the cyan color bar test wave when the burst is correctly phased relative to the I and Q signal phases.
Figure 15:
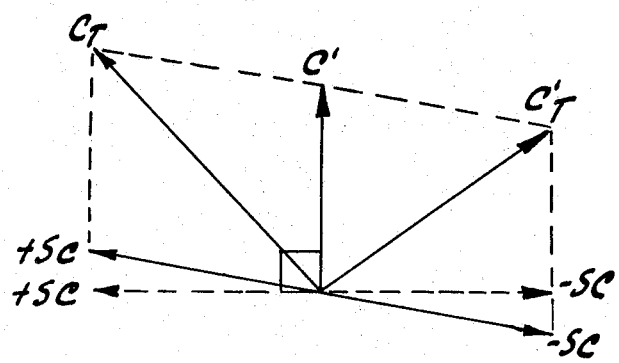
FIGURE 15 is a vector diagram of part of the wave of FIGURE 13c showing the unequal amplitudes of the cyan color bar test wave when the burst is incorrectly phased relative to the I and Q signal phases.

The vector diagrams of FIGURES 14 and 15 graphically depict the respective assumed cases of correct and incorrect burst phases. In FIGURE 14, with a correct burst phase and both polarities of the subcarrier wave in phase quadrature with the modified cyan wave C', both the $C_T$ and $C'_T$ waves have the same amplitude. In FIGURE 15, however, with an incorrect burst phase and neither polarity of the subcarrier wave in phase quadrature with the modified cyan wave C', the $C_T$ wave has an amplitude greater than that of the $C'_T$ wave.

Figure 16:
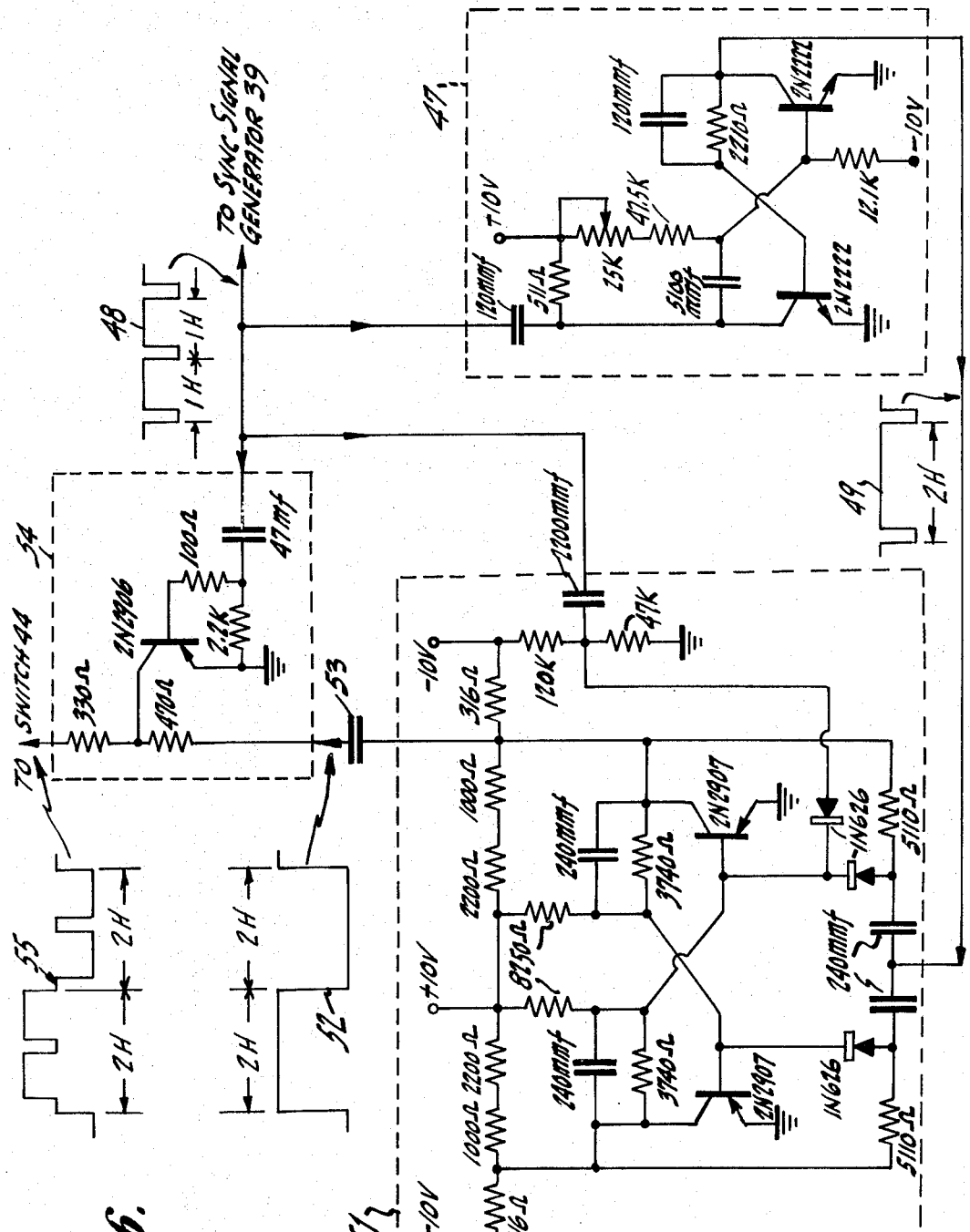
FIGURE 16 is a schematic circuit diagram of some of the apparatus shown in FIGURE 4 and illustrating the apparatus used in one practical case to develop the test signals used in this invention.

In FIGURE 4 the multivibrator 47, the flip flop circuit 51 and the phase test signal blanker 54 may comprise conventional apparatus of the type specified and of which many examples are found in the prior art. FIGURE 16, however, illustrates the configuration and details of circuits comprising such apparatus which have been successfully employed in a phase checking system such as that shown in and described with reference to FIGURE 4.

From the foregoing description of an illustrative embodiment of the invention it is seen that there is provided relatively simple apparatus which may be easily and quickly operated to check the phase relationships of critical wave components of a color television system operating in accordance with U.S. standards. An important feature of the invention is the representation of the phase relationships as wave amplitudes which are compared by simultaneous display on an oscilloscope screen.

What is claimed is:

1. Apparatus for checking the nominal quadrature phase relationship of two chrominance subcarrier wave components in a color television system, comprising:
    means for producing a first wave component having said subcarrier frequency and also having, in different time periods, first and second opposite phases and each phase of said first wave component having the same amplitude;

means for producing a second wave component having said subcarrier frequency and also having, in each of said different time periods, at least one test segment with a third phase nominally in quadrature with said first and second phases and with a fixed amplitude;

means for combining said first and second wave components to produce, in said different time periods, different composite test wave portions; and means for simultaneously displaying said different composite test wave portions on an oscilloscope, the relative amplitudes of a segment of said composite test wave occurring in said different test wave portions and corresponding to said one test segment being an indication of the phase relationship of said two chrominance subcarrier wave components.

2. Apparatus as defined in claim 1 wherein:
said first wave component is the Q chrominance subcarrier wave component; and
second wave component is the I chrominance subcarrier wave component.

3. Apparatus as defined in claim 1 wherein:
said first wave component is a signal representative of the subcarrier wave burst; and,
said second wave component is a signal nominally representative of cyan but modified to have a quadrature phase relationship to a properly phased subcarrier wave burst.

4. Apparatus for checking the nominal quadrature phase relationship of two chrominance subcarrier wave components in a color television system, comprising:

means for producing a first wave component having said subcarrier frequency and also having, in different horizontal line periods, first and second mutually opposing phases and each phase of said first wave component having the same amplitude;

means for producing a second wave component having said subcarrier frequency and also having, in each horizontal line period, at least one test segment with a third phase nominally in quadrature with each of said first and second phases and with a fixed amplitude;

means for combining said first and second wave components to produce, in different horizontal line periods, different composite test wave portions; and, means for simultaneously displaying said different composite test wave portions on an oscilloscope, the relative amplitudes of a segment of said composite test wave occurring in said different test wave portions and corresponding to said one test segment being an indication of the phase relationship of said two chrominance subcarrier wave components.

5. Apparatus for checking the phase relationship of the I and Q chrominance subcarrier wave components in a color television system, comprising:

means for producing a first subcarrier wave of a given frequency and including a first pair of segments respectively having opposite phases, one of which is a nominal Q phase and both of said segments having the same amplitude;

means for producing a second subcarrier wave of said given frequency and having a nominal I phase and a fixed amplitude;

means for combining said first and second subcarrier waves to produce a composite test wave including a second pair of segments; and, means for displaying said composite test wave on an oscilloscope, the relative amplitudes of said second pair of segments being an indication of the phase relationship of the I and Q chrominance subcarrier wave components.

6. Apparatus for checking the phase relationship of the I and Q chrominance subcarrier wave components in a color television system, comprising:

means for producing a first subcarrier wave of a given frequency and including a first plurality of segments respectively having one or the other of two opposite phases, one of which is a nominal Q phase and respectively having different amplitudes to represent the Q signal component of a composite subcarrier wave capable, when combined with a suitable I signal component, of employment to display, on a picture reproducing device, a series of adjacently placed bars of different colors;

means for producing a second subcarrier wave of said given frequency and having a nominal I phase and a fixed amplitude;

means for combining said first and second subcarrier waves to produce a composite test wave having a second plurality of segments;

means for displaying said composite test wave on an oscilloscope, the relative amplitudes of those ones of said second plurality of segments which occupy the positions of two immediately adjacent color bar signal waves being an indication of the phase relationship of the I and Q chrominance subcarrier wave components.

7. Apparatus for checking the phase relationship of the I and Q chrominance subcarrier wave components in a color television system, comprising:

means for producing a first subcarrier wave of a given frequency and including, in a given time period, a first plurality of segments respectively having one or the other of two opposite phases, one of which is a nominal Q phase and respectively having different amplitudes to represent the Q signal component of a composite subcarrier wave capable, when combined with a suitable I signal component, of employment to display, on a picture reproducing device, a series of bars of different colors including adjacently placed green and magenta bars;

means for producing a second subcarrier wave of said given frequency and having, in said given time period, a nominal I phase and a fixed amplitude;

means for combining said first and second subcarrier waves to produce a composite test wave having a second plurality of segments; and means for displaying said composite test wave on an oscilloscope, the relative amplitudes of those ones of said second plurality of segments which occupy the positions of the nominally green and magenta color bar signal waves being an indication of the phase relationship of the I and Q chrominance subcarrier wave components.

8. Apparatus for checking the nominal quadrature phase relationship of the I and Q chrominance subcarrier wave components in a color television system, comprising:

means for developing a modulating signal representative of the Q signal component of a composite color bar subcarrier wave signal;

means for producing a first wave of said subcarrier frequency and including, in a horizontal line period, a first plurality of segments respectively having one or the other of two opposite phases, one of which is a nominal Q phase and respectively having different amplitudes to represent the Q signal component of a composite subcarrier wave capable, when combined with a suitable I signal component, of employment to display, on a picture reproducing device, a series of bars of different colors including adjacently placed green and magenta bars;

means for producing a second wave of said subcarrier frequency and having, in a horizontal line period, a nominal I phase and a fixed amplitude;

means for combining said first and second subcarrier waves to produce a composite test wave having a second plurality of segments; and means for displaying said composite test wave on an oscilloscope, the relative amplitudes of those ones of said second plurality of the test wave segments which occupy the positions of the nominally green and magenta color bar signal waves being an indication of the phase relationship of the I and Q chrominance subcarrier wave components.

9. Apparatus for checking the relationship of the subcarrier wave burst to the I and Q chrominance subcarrier wave components in a color television system, comprising:

means normally operative in response to said I and Q chrominance subcarrier wave components for producing a first wave having said subcarrier frequency and also having, during each of two different time periods, a first segment of fixed phase and amplitude, said fixed phase normally not being in quadrature wtih said subcarrier wave burst;

means for modifying said first wave to effect a quadrature phase relationship between said first wave segment and a properly phased subcarrier wave burst;

means for producing a second wave having said subcarrier frequency and also having opposite subcarrier wave burst phases during said two different time periods;

means for combining said first and second waves to produce a test wave having, during each of said two different time periods, a second segment; and means for displaying said test wave on an oscilloscope, the relative amplitudes, displayed during two said different time periods, of the test wave segment corresponding to said one segment of said first wave being an indication of the phase relationship of the subcarrier wave burst to the I and Q chrominance subcarrier wave components.

10. Apparatus for checking the relationship of the subcarrier wave burst to the I and Q chrominance subcarrier wave components in a color television system, comprising:

mean normally operative in response to said I and Q chrominance subcarrier wave components for producing a first wave having said subcarrier frequency and also having, during each of two different horizontal line periods, a first series of time-spaced segments of different phases and amplitudes, none of said different phases normally being in quadrature with said subcarrier wave burst;

means for modifying said first wave to effect a quadrature phase relationship between one of said first wave segments and a properly phased subcarrier wave burst;

means for producing a second wave having said subcarrier frequency and also having opposite subcarrier wave burst phases during said two different horizontal line periods;

means for combining said first and second waves to produce a composite test wave having, during each of said two different horizontal line periods, a second series of time-spaced segments; and means for displaying said composite test wave on an oscilloscope, the relative amplitudes, displayed during said two different horizontal line periods, of the test wave segment corresponding to said one segment of said first wave being an indication of the phase relationship of the subcarrier wave burst to the I and Q chrominance subcarrier wave components.

11. Apparatus for checking the relationship of the subcarrier wave burst to the I and Q chrominance subcarrier wave components in a color television system, comprising:

means normally operative in response to said I and Q chrominance subcarrier wave components for producing a first wave having said subcarrier frequency and also having, during each of successive horizontal line periods, a first series of time-spaced segments of different phases and amplitudes representative respectively of different colors, none of said different phases normally being in quadrature with said subcarrier wave burst;

means for modifying said I and Q chrominance subcarrier wave components and, hence, said first wave to effect a quadrature phase relationship between one of said first wave segments and a properly phased subcarrier wave burst;

means for producing a second wave having said subcarrier frequency and also having opposite subcarrier wave burst phases during alternate horizontal line periods;

means for combining said first and second waves to produce a composite test wave having, during each of successive horizontal line periods, a second series of time-spaced segments; and means for displaying said composite test wave on an oscilloscope, the relative amplitudes, displayed during two successive horizontal line periods, of the test wave segment corresponding to said one segment of said first wave being an indication of the phase relationship of the subcarrier wave burst to the I and Q chrominance subcarrier wave components.

12. Apparatus for checking the relationship of the subcarrier wave burst to the I and Q chrominance subcarrier wave components in a color television system, comprising:

a source of a plurality of color representative signals;

means normally operative in response to said color representative signals for developing said I and Q chrominance subcarrier wave components;

means normally operative in response to said I and Q chrominance subcarrier wave components for producing a first wave having said subcarrier frequency and also having, during each of successive horizontal line periods, a series of time-spaced segments of different phases and amplitudes representative respectively of different colors, none of said different phases normally being in quadrature with said subcarrier wave burst;

means for modifying the amplitude of one of said color representative signals and, as a consequence, said first wave to effect a quadrature phase relationship between one of said first wave segments and a properly phased subcarrier wave burst;

means for producing a second wave having said subcarrier frequency and also having opposite subcarrier wave burst phases during alternate horizontal line periods;

means for combining said first and second waves to produce a composite test wave having, during each of successive horizontal line periods, a second series of time-spaced segments; and means for displaying said composite test wave on an oscilloscope, the relative amplitudes, displayed during two successive horizontal line periods, of the test wave segment corresponding to said one segment of said first wave being an indication of the phase relationship of the subcarrier wave burst to the I and Q chrominance subcarrier wave components.

13. In a color television subcarrier signal forming apparatus of the type including first and second modulators for modulating quadrature phase components of a subcarrier wave with a pair of video signal components representative of color, and including a synchronizing signal generator providing synchronizing pulses recurring at a horizontal line scanning rate;

a test circuit including first and second input circuit means for connection respectively to two sources of video signals representative of color;
means connecting said first input circuit means to said first modulator;
means providing a test signal of constant amplitude during the interval of said horizontal line; and
switching means for selectively connecting said second modulator with (1) said second signal input circuit means and (2) said means providing a test signal.

14. In a color television subcarrier signal forming apparatus of the type including first and second modulators for modulating quadrature phase components of a subcarrier wave with a pair of video signal components representative of color, and including a synchronizing signal generator providing synchronizing pulses recurring at a horizontal line scanning rate;
a test circuit including first and second input circuit means for connection respectively to two sources of video signals representative of color;
means connecting said first input circuit means to said first modulator;
means providing a test signal of constant amplitude and first polarity during the interval of one horizontal line and of the same constant amplitude but of opposite polarity during a succeeding horizontal line;
switching means for selectively connecting said second modulator with (1) said second signal input circuit means and (2) said means providing a test signal.

15. In a color television subcarrier signal forming apparatus of the type including first and second modulators for modulating quadrature phase components of a subcarrier wave with a pair of video signal components representative of color, and including a synchronizing signal generator providing synchronizing pulses recurring at a horizontal line scanning rate;
a test circuit including first and second input circuit means for connection respectively to two sources of video signals representative of color;
means connecting said first and second input circuit means to said first and second modulators respectively;
means providing a burst flag generator coupled to said synchronizing signal separator for providing a burst flag pulse occurring at a time between successive horizontal scanning lines;
means providing a burst flag regenerator having an input circuit and an output circuit, said output circuit coupled in common to said first and second modulators,
means providing a test signal of constant amplitude and first polarity during the interval of one horizontal line and of the same constant amplitude but of opposite polarity during a succeeding horizontal line;
switching means for selectively connecting the input circuit of said burst flag regenerator to (1) said burst flag generator and to (2) said means providing a test signal.

No references cited.

DAVID G. REDINBAUGH, *Primary Examiner.*

J. O'BRIEN, *Assistant Examiner.*